United States Patent Office.

ALLEN YOUNG, OF PITTSBOROUGH, NORTH CAROLINA.

Letters Patent No. 102,194, dated April 19, 1870.

IMPROVEMENT IN MEDICINE FOR COUGHS AND COLDS.

The Schedule referred to in these Letters Patent and making part of the same.

*To all whom it may concern:*

Be it known that I, ALLEN YOUNG, of Pittsborough, in the county of Chatham and in the State of North Carolina, have invented a certain new and useful "Bronchial Sirup," for Coughs, Colds, &c.; and I do hereby declare that the following is a full, clear, and exact description thereof.

The nature of my invention consists in compounding the camphorated tincture of opium, vinegar, spirits of lavender, alcohol, capsicum, and sirup or honey, to form a medicine for the cure of coughs and colds.

To make the bronchial sirup, having the correct proportion of the ingredients, any one of the usual ways of mixing similar compounds is pursued.

To enable others skilled in the art to prepare my medicine, I will now give the proportions necessary to make a pint of my improved bronchial sirup.

Take of the tinctura opii camphora, (camphorated tincture of opium,) one (1) fluid ounce; of acetum, (vinegar,) one (1) fluid ounce; of spiritus lavendulæ, (spirits of lavender,) one-half ($\frac{1}{2}$) fluid ounce; alcohol, one (1) fluid ounce; of capsicum, ninety-two (92) grains; and of cane-sirup or molasses, or honey, twelve and a half ($12\frac{1}{2}$) fluid ounces.

The above are the requisite proportions to make one pint of the bronchial sirup, and when properly mixed, will be found to possess the most beneficial effects in breaking up coughs, dissipating colds in the head, and similar disorders, such as croup, asthma, bronchitis, and incipient consumption.

It also acts as an invigorating tonic, through its stimulating and strengthening action upon the alimentary canal, and relieving in severe cases of dyspepsia, and entirely curing, in cases that are not utterly hopeless, loss of appetite, general debility, &c., being dissipated from the alterative influence of the sirup upon the general system, and being perfectly harmless, never producing any unpleasant symptoms or doing the slightest injury to the most delicate stomach.

Any desired quantity of the sirup can be made by observing the proportions above given for compounding a pint of the medicine.

Having thus fully described my invention,

What I claim as new, and desire to secure by Letters Patent, is—

The combination of the above-named ingredients, in or about the proportions specified as a bronchial sirup, compounded as and for the purposes set forth.

In testimony that I claim the above-described certain new and useful bronchial sirup, for coughs, colds, &c., I have hereunto signed my name this 26th day of March, 1868.

ALLEN YOUNG.

Witnesses:
  JNO. MANNING, Jr.,
  T. G. CLAYTON.